(12) United States Patent
Hermans et al.

(10) Patent No.: US 11,746,549 B2
(45) Date of Patent: Sep. 5, 2023

(54) PLUNGE POOL

(71) Applicant: PLUNGIE IP PTY LTD, Crestmead (AU)

(72) Inventors: Ty Gerard Hermans, Margate (AU); Ben Petersen, Browns Plains (AU); Mayer Jung, Fortitude Valley (AU); Michael Gannon, Browns Plains (AU)

(73) Assignee: PLUNGIE IP PTY LTD, Crestmead (AU)

( * ) Notice: Subject to any disclaimer, the term of this patent is extended or adjusted under 35 U.S.C. 154(b) by 0 days.

(21) Appl. No.: 17/838,492

(22) Filed: Jun. 13, 2022

(65) Prior Publication Data
US 2022/0316227 A1    Oct. 6, 2022

Related U.S. Application Data

(63) Continuation of application No. 16/970,157, filed as application No. PCT/AU2019/050124 on Feb. 15, 2019, now Pat. No. 11,454,039.

(30) Foreign Application Priority Data

Feb. 16, 2018    (AU) ................ 2018900498

(51) Int. Cl.
*E04H 4/00*    (2006.01)
*E04H 4/14*    (2006.01)

(52) U.S. Cl.
CPC ........... *E04H 4/0093* (2013.01); *E04H 4/144* (2013.01)

(58) Field of Classification Search
CPC .............. E04H 4/0093; E04H 4/144
USPC .......................................... 4/507
See application file for complete search history.

(56) References Cited

U.S. PATENT DOCUMENTS

| | | | |
|---|---|---|---|
| 1,908,332 A | 5/1933 | Eichelman et al. | |
| 2,886,828 A | 5/1959 | Latucca | |
| 2,902,157 A | 9/1959 | Culver | |
| 3,660,957 A | 5/1972 | Schankler | |
| 3,748,810 A | 7/1973 | Mattingly | |
| 3,832,812 A | 9/1974 | Hiatt | |
| 3,832,814 A * | 9/1974 | Teschner | E04H 4/0081 52/432 |

(Continued)

FOREIGN PATENT DOCUMENTS

| | | |
|---|---|---|
| AU | 41764/78 B1 | 6/1979 |
| AU | 7617981 A | 5/1982 |

(Continued)

OTHER PUBLICATIONS

North Coast Tanks Pty Ltd—Concrete Plunge Pools [Viewed on internet on Oct. 9, 2019], <URL:https://web.archive.org/web/20170216182510/http://www.northcoasttanks.com.au/downloads/NCT_Pool_Brochure.pdf > published on Feb. 16, 2017 as per Wayback Machine.

(Continued)

*Primary Examiner* — Huyen D Le
(74) *Attorney, Agent, or Firm* — Dilworth & Barrese, LLP

(57) ABSTRACT

A pool, preferably a plunge pool, that can be prefabricated and on site installed in a short space of time is provided. The pool is integrally formed, resulting in a unitary pool shell having a floor, one or more sidewalls connected to the floor, a surface, such as a step or bench, extending from at least one of the sidewalls; and a peripheral wall extending from the surface to the floor.

10 Claims, 5 Drawing Sheets

(56) References Cited

U.S. PATENT DOCUMENTS

| | | | |
|---|---|---|---|
| 3,962,734 A | | 6/1976 | Chase |
| 4,060,946 A | * | 12/1977 | Lang ............... E04H 4/0043 |
| | | | 52/741.12 |
| 4,227,266 A | | 10/1980 | Russell |
| 5,531,352 A | * | 7/1996 | Kraft ................ B65D 19/38 |
| | | | 220/675 |
| 5,678,256 A | | 10/1997 | Lea |
| 6,637,162 B1 | | 10/2003 | Holland |
| 7,958,615 B1 | | 6/2011 | Conn |
| 8,225,577 B1 | | 7/2012 | Fender |
| 10,478,377 B1 | * | 11/2019 | Selinger ............ A61H 33/6005 |
| 11,454,039 B2 | * | 9/2022 | Hermans ............... E04H 4/144 |
| 2009/0151066 A1 | | 6/2009 | Sullivan |
| 2010/0030060 A1 | | 2/2010 | Sublett |
| 2012/0222209 A1 | | 9/2012 | Schueler |
| 2013/0014321 A1 | | 1/2013 | Sullivan |
| 2014/0101841 A1 | | 4/2014 | Bentley |
| 2015/0033755 A1 | | 11/2015 | Romano |

FOREIGN PATENT DOCUMENTS

| | | |
|---|---|---|
| FR | 2923510 A1 | 5/2009 |
| WO | 2010030060 A1 | 3/2010 |

OTHER PUBLICATIONS

Allcast Precast—Concrete Plunge Pool [Viewed on internet on Oct. 9, 2019], URL:https://web.archive.org/web/20180201031823/http://www.allcastprecast.com.au/products/plunge-pools published on Feb. 1, 2018 as per Wayback Machine.

Jetstream Swim Spas—Holloways Beach Pool Install [Viewed on internet on May 28, 2020], <URL:https://www.jetstreampools.com/annete-and-pauls-pool/ published on Feb. 20, 2015 as per Wayback Machine.

Jetstream Pools [Viewed on internet on May 28, 2020], <URL:http://jetstreampools.com/wpcontent/uploads/2010/09/JS_A4_BrochureFINAL.pdf published on Mar. 5, 2016 as per Wayback Machine.

Cast-In Anchoring Solutions : Design Manual, ITW Construction Systems Australia Pty. Ltd., 2010, pp. 1-44.

Wdianto et al., "Design of Anchor Reinforcement in Concrete Pedestals,",CSA Today, vol. III, No. 12, 2005, pp. 1-20.

www.emisupplies.com/precast.html DB Anchor lift Systems, Apr. 4, 2012, retrieved from https://web.archive.org on May 20, 2022.

"CA Construction Anchors, Inc.: Concrete Supplies & Building Materials," SAMS Custom Catalog Services, 2009, pp. 88-114.

Elephant Foot™ Ferrule, ITW Construction Systems Australia Pty. Ltd., 2017.

Green tiles with crazed effect . . . —Australian plunge pools. Facebook. (n.d.) Retrieved Jul. 25, 2022, from https://m.facebook.com/ausplungepools/photos/a.556601924397160/850355265021823/?type=3&source=54 (shows lifting rings, see especially the image above the comments).

Gallery. plunge Pools, (Mar. 10, 2020). Retrieved Jul. 25, 2022, from https://australianplungepools.com.au/gallery/.

Major projects. Australian Plunge Pools. (Dec. 6, 2017) Retrieved Jul. 25, 2022, from http://web.archive.org/web.archive.org/web/201802204040115/http:/ australianplungepools.com.au/majorprojects/.

Australian plunge pools. Wayback Machine. Retrieved Jul. 25, 2022, from https://web.archive.org/web/20170308161758/http:/australianplungepools.blogspot.com.au/.

App Brochure. Wayback Machine. Retrieved Jul. 25, 2022, from www.australianplungepools.com.au/app_brochure.pdf.

* cited by examiner

PLUNGE POOL

FIELD OF THE INVENTION

The invention relates to a pool, preferably a plunge pool. In particular, the invention relates, but is not limited, to an integrally formed pre-cast plunge pool.

BACKGROUND TO THE INVENTION

Reference to background art herein is not to be construed as an admission that such art constitutes common general knowledge.

One option for installing a pool is a concrete pool. Concrete pools, which offer significant structural integrity compared to some other pool types, are typically built on-site in an excavated cavity. This installation process typically takes up to 10 weeks due to various stages of planning and engineering, excavation, council approval, and concrete curing and coating times.

A further disadvantage of concrete pools, particularly rectangular shaped pools, is that they require a bond beam around their upper edge for strength. The bond beam is effectively an enlarged reinforced boss around the top of the pool which, in an in-ground installation, is typically concealed with coping and adjacent ground work. While the bond beam adds strength, it also adds weight, bulk, is unsightly if the edge is visible, and precludes an infinity style edge.

An alternative to concrete pools is prefabricated pools. Prefabricated pools are typically manufactured to reduce the assembly required to be performed on-site during installation. In particular, the prefabricated pool can be placed into an excavated site or placed above ground. In addition, prefabricated pools can be assembled quickly and at a lower cost to concrete pools.

These prefabricated pools are often formed as a single shell from strong yet lightweight plastic materials, such as polyvinyl chloride, for example, fibreglass, or metal. While these materials are relatively cheap, they do not offer the same structural integrity or refined finish of concrete pools. For example prefabricated pools can be prone to cracking, warping or collapse of their walls which can be costly to repair. Prefabricated pools can also be damaged while being lifted and lowered into position by a crane.

While some prefabricated pool shells have been made of stronger materials, these also have disadvantages. Any features, such as steps, benches, or seats, are typically solid. This greatly increases the material cost and weight of any pools including such features. Added weight further adds cost during transportation and lifting of the prefabricated pool. Another disadvantage is that finishing is typically required on site which adds further cost and delay, particularly if the pool is to be installed at a remote location.

OBJECT OF THE INVENTION

It is an aim of this invention to provide a plunge pool which overcomes or ameliorates one or more of the disadvantages or problems described above, or which at least provides a useful commercial alternative.

Other preferred objects of the present invention will become apparent from the following description.

SUMMARY OF INVENTION

In one form, although it need not be the only or indeed the broadest form, there is provided a pool, preferably a plunge pool, comprising:

a floor;
one or more sidewalls connected to the floor;
a surface extending from at least one of the sidewalls; and
a peripheral wall extending from the surface to the floor,
wherein the floor, sidewalls, peripheral wall and surface are integrally formed.

Preferably the joins between at least the walls and sidewalls is reinforced. Preferably the joins are reinforced with a chamfered or angled portion.

Preferably, the surface extends substantially perpendicularly from the sidewall. Preferably, the peripheral wall extends substantially perpendicularly from the surface. In use, the surface is preferably substantially horizontal and the peripheral wall is preferably substantially vertical. Preferably, the second surface is in the form of a seat, bench, or step.

Preferably, the plunge pool is formed from a cementitious material. Preferably, the cementitious material is concrete. The cementitious material may comprise cement alternatives (whilst still being of the nature of cement). For example, cementitious material may comprise a geopolymer binder. The geopolymer binder may result from a chemical activation of flyash and slag.

Preferably, one or more reinforcing elements are located within the floor, sidewalls, peripheral wall and/or surface. The reinforcing elements may comprise fibre reinforcement, preferably comprising plastic fibres. Preferably, the reinforcing elements are reinforcing rods. Preferably, the reinforcing rods are arranged in a mesh configuration. Preferably the reinforcing rods form a reinforcement cage. The reinforcing rods may be made of steel. Alternatively, the reinforcing rods may be made of composite materials.

Preferably, one or more attachment points are located within at least one of the floor, sidewalls and peripheral wall. More preferably, the attachment points comprise ferrules. Even more preferably, the ferrules are threaded. Preferably the attachment points, preferably ferrules, are mounted to the reinforcing rods. Preferably the attachment points comprise covers. Preferably the covers can be affixed to or over the ferrules. Preferably the covers conceal the ferrules.

Preferably, a second surface is attached or connected to one or more of the sidewalls. Preferably, the second surface extends substantially perpendicularly from the one or more sidewalls. Preferably, the second surface is in the form of a seat, bench, or step.

Preferably, one or more of the sidewalls includes an aperture. Preferably the aperture is a cutout section of the sidewall. Preferably the cutout section is configured to receive a skimmer box.

Preferably, a cavity is formed adjacent the peripheral wall and the surface. Preferably the plunge pool has an internal surface and an external surface. Preferably a swimming hollow is defined by the internal surface. Preferably the cavity is defined by the external surface. Preferably the internal surface is waterproofed. Preferably the internal surface is treated but, alternatively, it may be tiled. Preferably the internal surface is treated with a spray on thermopolymer such as, for example, EcoFinish™.

Further surfaces may extend from the peripheral wall and a further peripheral wall may extend from the further surfaces.

Preferably, the floor, sidewalls, surface, and/or peripheral wall have a thickness of between approximately 80 mm to 120 mm. More preferably, a thickness of between approximately 90 mm to 110 mm. Even more preferably, a thickness of approximately 100 mm. Preferably the floor, sidewalls, surface, and peripheral wall have substantially the same thickness. Preferably the side walls have a substantially constant thickness from where they join the floor to a peripheral edge. Preferably a peripheral edge of substantially planar side walls is substantially the same thickness as the wall itself.

Openings for spa blowers, or the like, may be formed in the sidewalls and/or peripheral wall.

Preferably the plunge pool comprises a water recirculation and cleaning system. Preferably the water recirculation system comprises pipework and a pump. Preferably the cleaning system comprises a pool filter. Preferably the cleaning system comprises a sanitisation system such as, for example, a chlorinator.

In another form, the invention resides in a method of forming and installing a pool, preferably a plunge pool, the method comprising the steps of:
    forming an integral plunge pool shell having at least one step or seat feature in a mould;
    extracting the plunge pool shell from the mould; and
    finishing an internal surface of the plunge pool to be waterproof.

Preferably the step of finishing the internal surface of the plunge pool comprises treating the surface with a thermopolymer.

Preferably, the method comprises the further step of transporting the plunge pool to, and installing the plunge pool shell at, a desired location. Preferably the step of installing the plunge pool shell at a desired location comprises lifting the plunge pool using ferrules located in a floor of the plunge pool shell.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
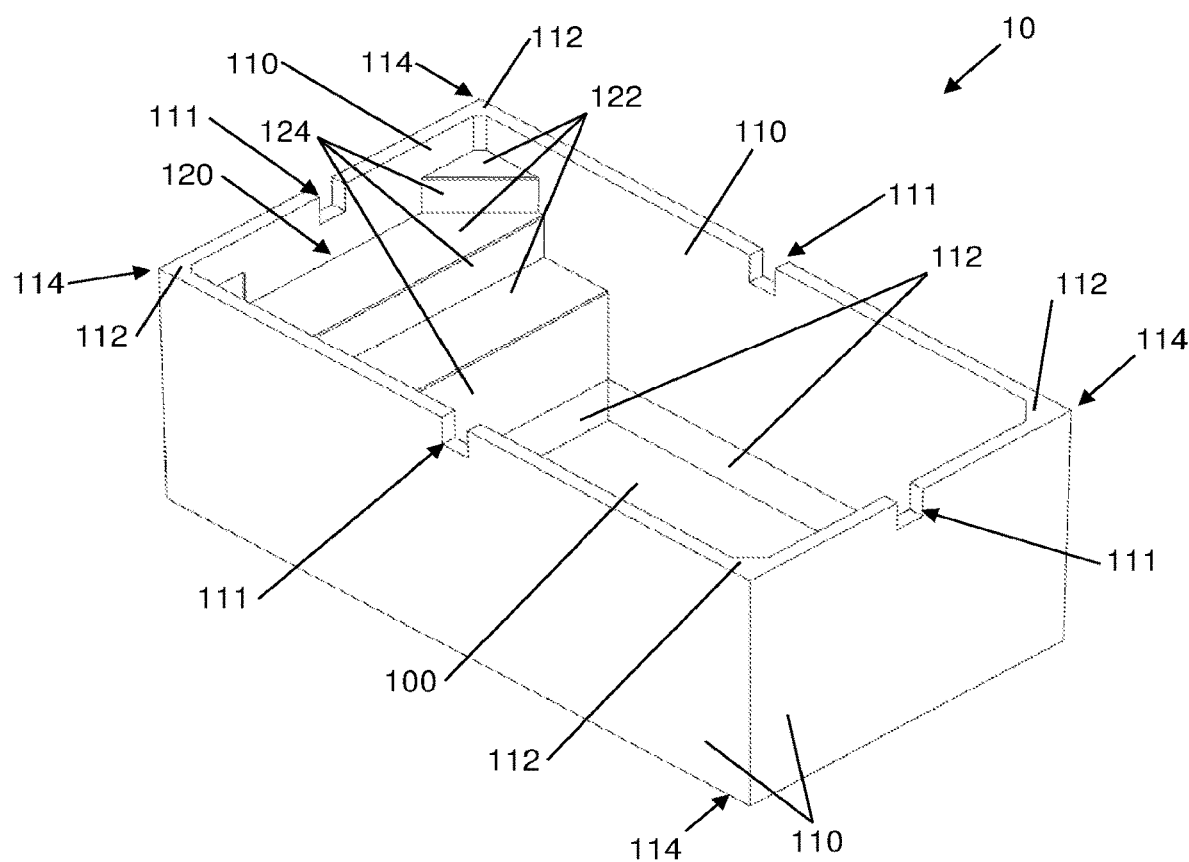
FIG. 1 illustrates a perspective view of a rectangular plunge pool according to an embodiment of the present invention.

The present invention relates to a plunge pool. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

Shown in FIG. 1 is a rectangular plunge pool 10, preferably prefabricated, suitable for installation as both an aboveground and in-ground pool.

Figure 3:
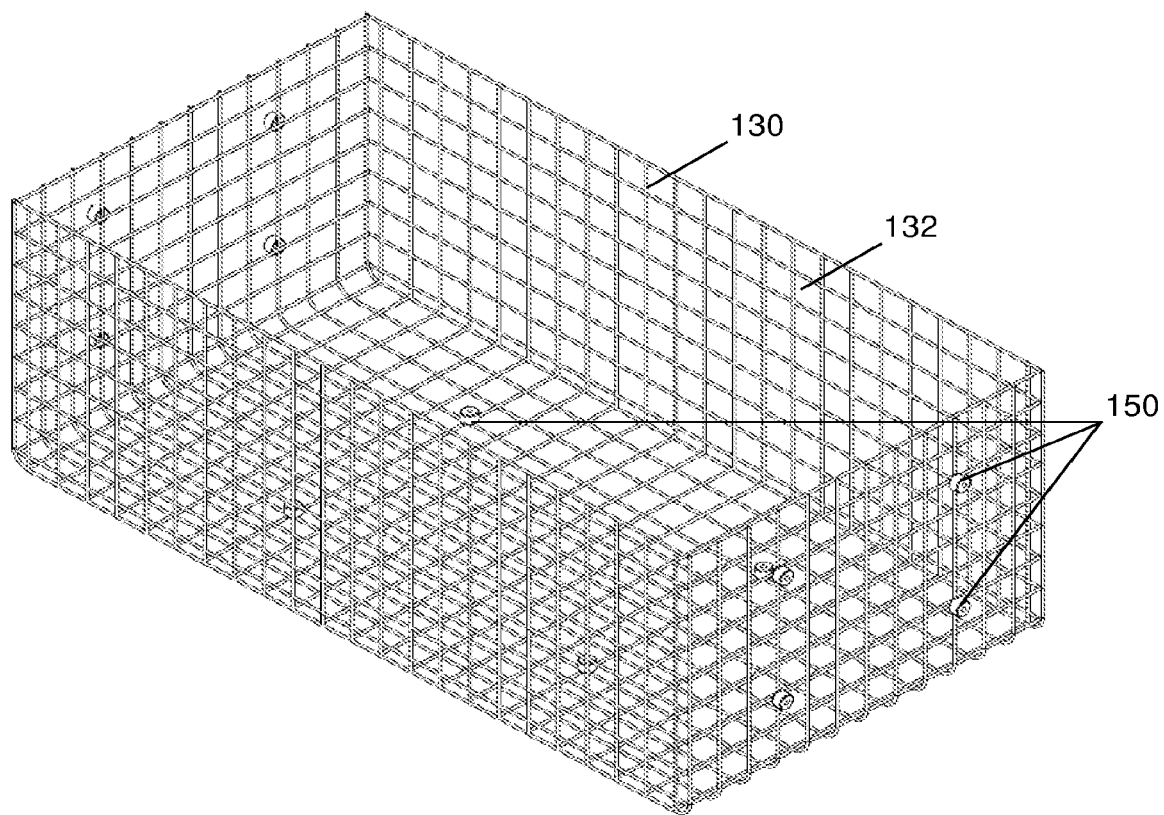
FIG. 3 illustrates a perspective view of a mesh structure of reinforcing rods for forming a plunge pool according to an embodiment of the present invention.

The illustrated plunge pool 10 includes a floor 100 and four sidewalls 110. Projecting from at least one of the sidewalls 110, such as the lateral wall as shown in FIG. 1, is a set of steps 120. The steps 120 are made up of three horizontally extending surfaces 122, each connected to a vertically extending peripheral wall 124. The sidewalls 110, floor 100, peripheral walls 124 and surfaces 122 are formed integrally, creating a unitary monolithic pool shell. The sidewalls 110, floor 100, peripheral walls 124 and surfaces 122 are preferably formed integrally from any cementitious material such as concrete, for example, over a mesh structure of reinforcing rods 130 (shown in FIG. 3). It should be appreciated that the cementitious material may comprise cement (e.g. Portland cement) alternatives, whilst still being of the nature of cement, such as an 'Earth Friendly Concrete' (EFC) comprising a geopolymer binder that is made from the chemical activation of flyash and slag.

In the illustrated embodiment, each of the sidewalls 110 includes four apertures in the form of cutout sections 111 for receiving a skimmer box or the like (not shown). However, some embodiments of the plunge pool may include only one cutout section for a single skimmer box or other pool features. The need for cutout sections 111 will vary from pool to pool, but typically there will be none, one, or two. Although the illustrations show four cutout sections 111, this is for example only and in typical installations four would not be required.

Figure 2:
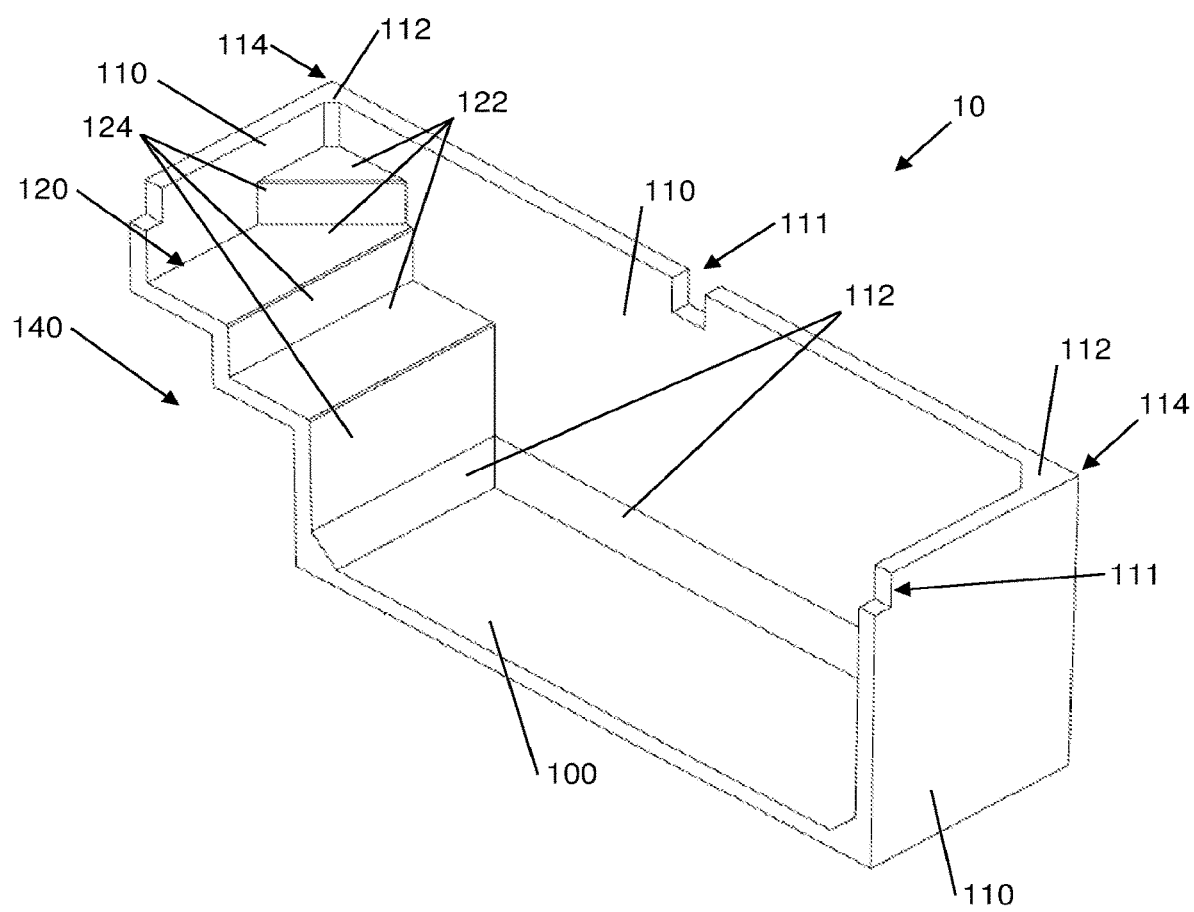
FIG. 2 illustrates a cross-section of the plunge pool shown in FIG. 1.
Figure 5:
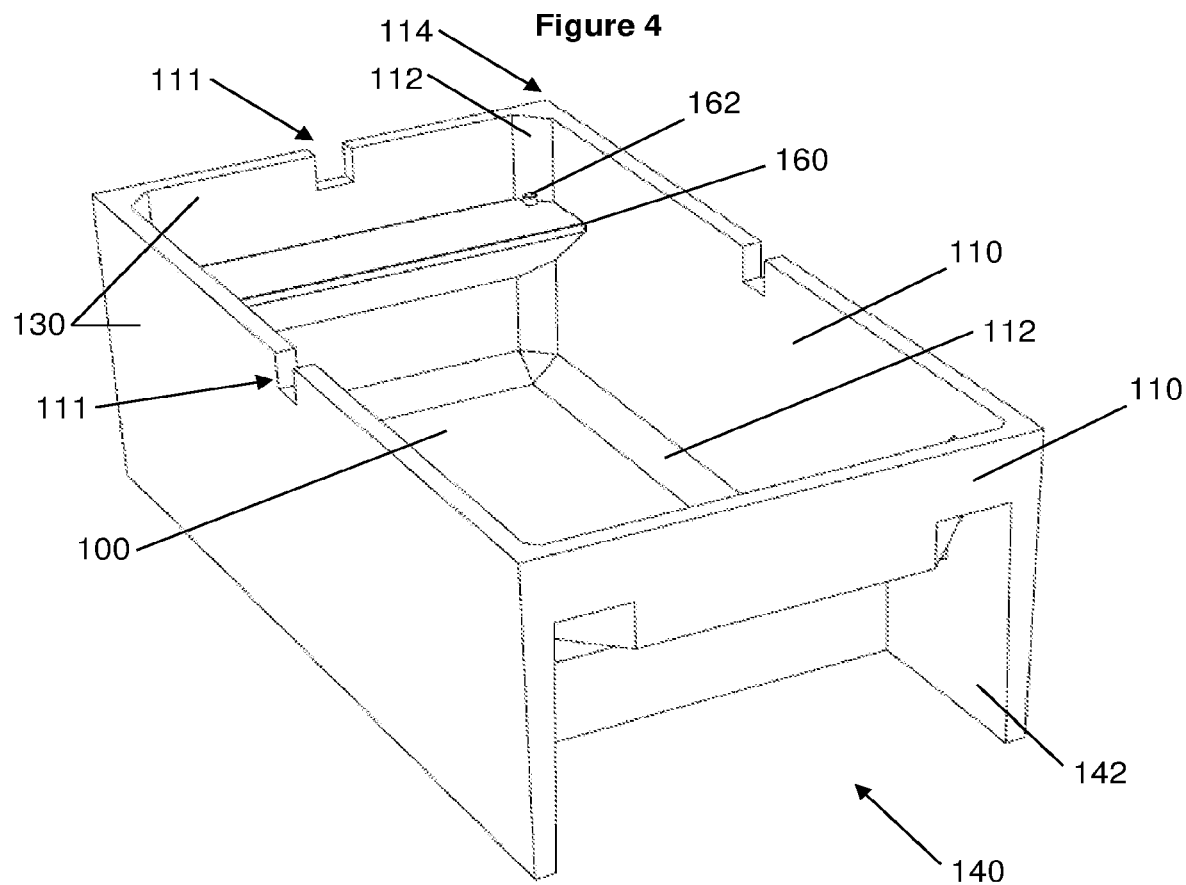
FIG. 5 illustrates a perspective view of a plunge pool according to another embodiment of the present invention.

With reference to FIG. 2, which shows a cross-section of the plunge pool 10 in FIG. 1, it can be seen that the area behind the steps 120 is hollow or unfilled and forms a cavity 140. The cavity as illustrated in FIG. 5 is further defined by wings 142 that are effectively extensions of the side walls 110.

The cavity 140 reduces the volume of concrete necessary to form the plunge pool 10 while consequently reducing the overall weight of the plunge pool thereby making it easier to transport. In addition, the cavity 140 can be used to house and conceal pumps and filtration systems necessary to keep the water in the plunge pool 10 from stagnating or becoming dirty.

It can also be seen that a chamfered or angled portion 112 is present where each of the sidewalls 110 meet to form corners 114. These chamfered corners 112 provide additional strengthening of the corners 114 which are subject to the most force when filled with water. A similarly chamfered corner 112 is present where each of the sidewalls 110 meet the floor 100. The chamfered or angled portions 112 are solid and may, depending on needs, include reinforcing bars therein.

Located within the concrete is an arrangement of reinforcing rods 130 (visible in FIG. 3), such as rebar, for example, which provide reinforcement for the plunge pool 10. The arrangement is in the form of a steel mesh cage.

Figure 4:
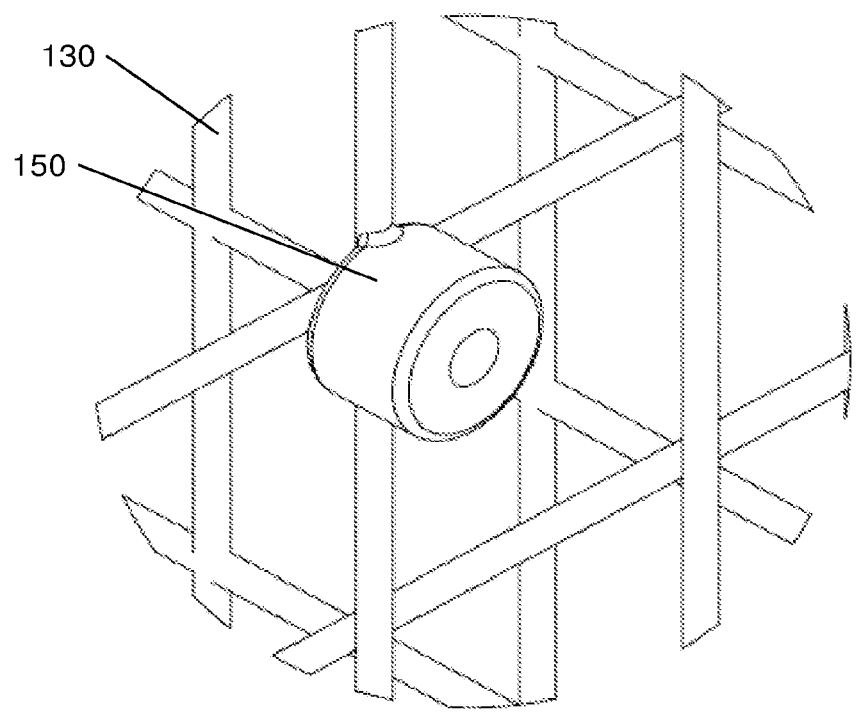
FIG. 4 illustrates a detail of a ferrule attached to the reinforcing rods of the mesh structure shown in FIG. 3.

Located within the concrete of the plunge pool 10 and attached to the reinforcing rods 130 are multiple attachment points in the form of threaded ferrules 150 (also shown in the detail of FIG. 4). The ferrules 150 are typically mounted to the reinforcing rods 130 by welding but could be attached by any suitable method. The threaded ferrules 150 provide lifting points for a crane (not shown) and also allow the mesh structure to be pre-tensioned prior to concrete being poured or otherwise applied to the structure. Although there are ferrules in both the floor 100 and side walls 110 which can be used during the production and moulding, typically only the ferrules 150 in the floor 100 are left exposed for use during manoeuvring and delivery. It should be appreciated that the attachment points, preferably ferrules 150, could be exposed in either the inner surface or outer surface of the plunge pool 10 (with corresponding connection occurring from the inside or outside of the plunge pool 10).

In forming the plunge pool 10, reinforcing rods 130 are laid out in a mesh pattern within a mould or formwork (not shown). An example of this reinforcing rod arrangement can be seen in FIG. 3 where reinforcing rods 130 are arranged in a rectangular shape. It will be appreciated that in forming a plunge pool 10 such as the one shown in FIG. 1, the reinforcing rods 130 would be arranged in such a way that the concrete, once applied, would form the step, as described above.

Once the reinforcing rods 130 have been appropriately arranged the threaded ferrules 150 are attached to bolts from the mould to ensure that the threaded ferrules 150 are in the same position every time. This also allows the reinforcing rods 130 to be pretensioned.

Subsequently, the concrete is poured onto the reinforcing rods 130 in the mould or formwork, or otherwise applied to the reinforcing rods 130, by spraying, for example. Once the concrete is set, a treatment such as a polymer coating, preferably a thermo-polymer coating, is applied to the concrete to provide a smooth texture and look to the finished plunge pool 10.

Once the polymer coating has set, the ferrules 150 in the floor are attached to a crane (not shown) which lifts and transports to pool to be installed at the desired location. The crane is then disconnected from the ferrules 150 which are then filled, using a cover (not shown) or resin or the like.

In another embodiment, shown in FIG. 5, the plunge pool 10, as described above in relation to FIG. 1, includes a further feature in the form of a seat 160. The seat 160 is both mechanically and chemically attached to the concrete side wall.

The seat 160 is typically manufactured from either steel, such as stainless steel, for example, or aluminium and is fully seal welded to be leak-proof. However, the seat 160 could be formed from any suitably heat-resistant material. Once mounted, the seat 160 can be filled with water to allow treatment including a thermos spray interior process, such as Ecofinish™ aquaBRIGHT™, to occur without distorting the seat 160 as it is subjected to a high temperature from a flame gun or similar. Once the treatment coating has been applied the water inside the seat 160 can be topped up above a neck filler 162, then capped off. This process results in a slightly pressurised seat that feels solid under foot. A small corner block step (not shown) may then be placed over the filler neck.

In some particular embodiments (not shown), openings or recesses can be formed in the concrete to facilitate the installation of spa blowers or the like.

Figure 6:
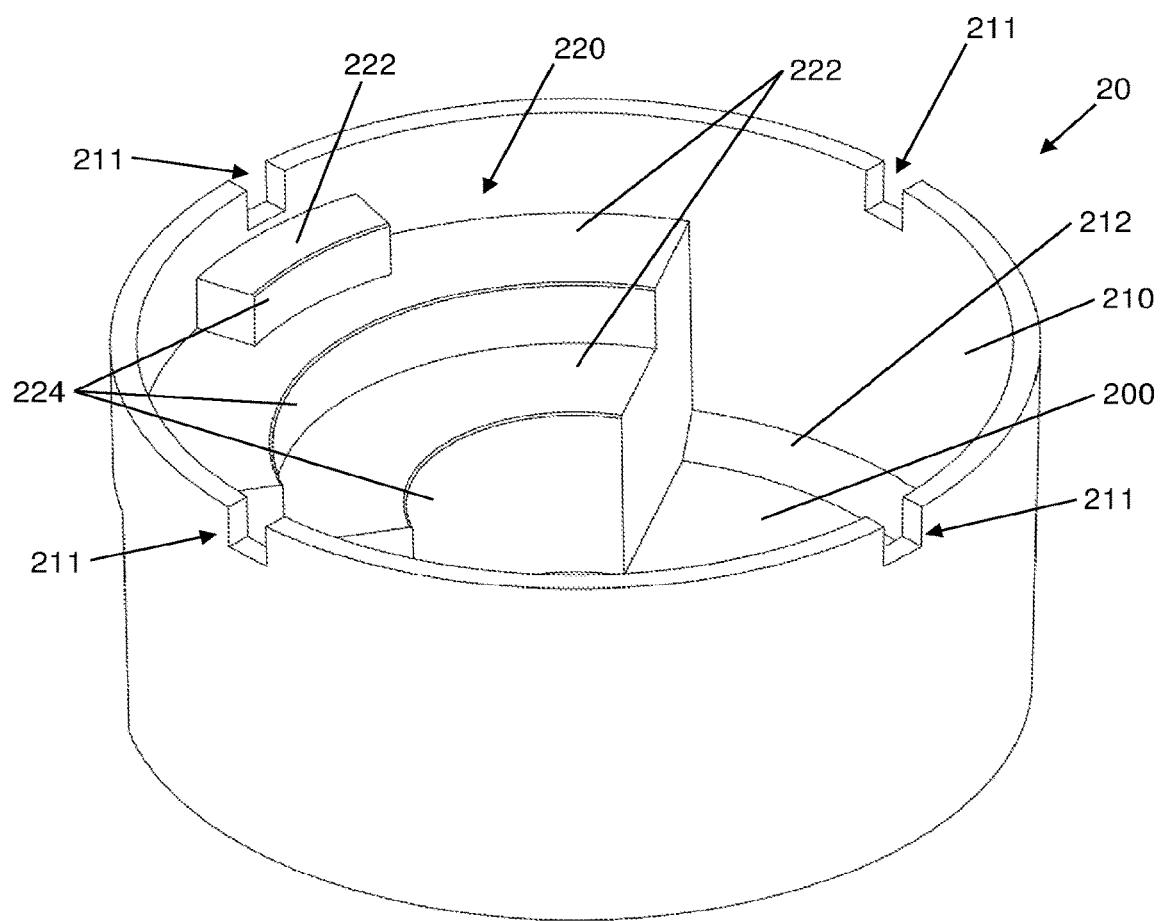
FIG. 6 illustrates a perspective view of a circular plunge pool according to an embodiment of the present invention.

Shown in FIG. 6 is a circular plunge pool 20 suitable for installation as both an aboveground and in-ground pool. The circular plunge pool 20 is substantially similar to the rectangular plunge pool 10 shown in FIG. 1 but is circular.

The illustrated plunge pool 20 includes a floor 200 and a single sidewall 210. Projecting from the sidewall 210 is a set of steps 220. The steps 220 are made up of three horizontally extending surfaces 222, each connected to a vertically extending peripheral wall 224. The floor 200, sidewall 210, platforms 222 and peripheral walls 224 are formed integrally and of any cementitious material such as concrete, for example, over a mesh structure of reinforcing rods. While the structure of reinforcing rods is not shown, it is substantially similar to the structure described above in relation to the rectangular plunge pool 10 and shown in FIG. 3.

In the illustrated embodiment, the sidewall 210 includes four cutout sections 211 spaced equidistantly around the perimeter of the sidewall 210 for receiving a skimmer box (not shown). While the present embodiment shows four cutouts 211, the invention can include any number of cutout sections.

It can also be seen that a chamfered or angled portion 212 is present where the sidewall 210 meets the floor 200 to form a corner 214. These chamfered corners 212 provide additional strengthening of the corners which are subject to the most force when filled with water.

Figure 7:
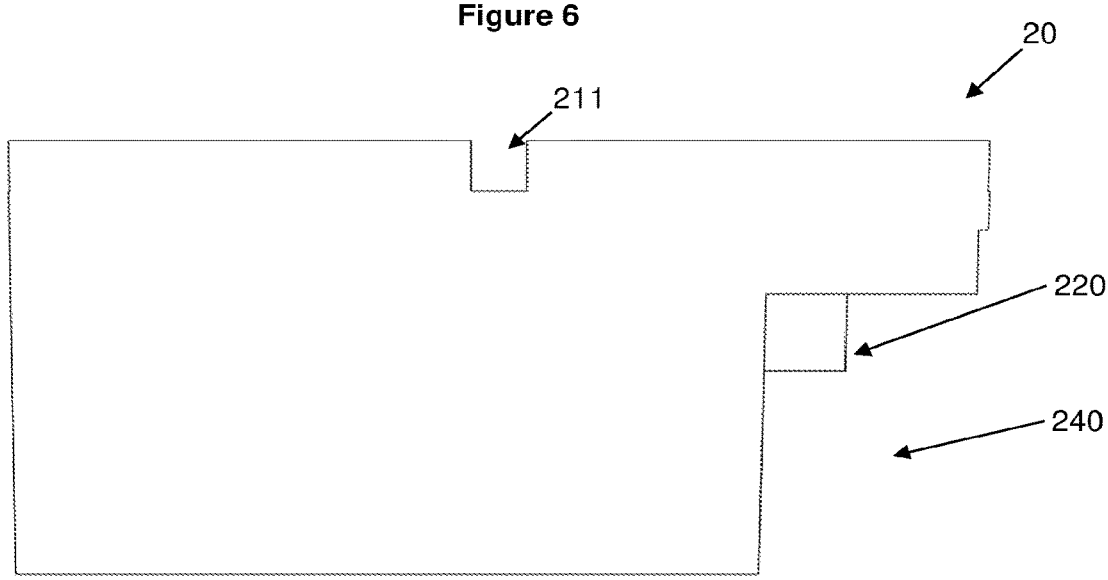
FIG. 7 illustrates a side view of the circular plunge pool shown in FIG. 6.

With reference to FIG. 7, which shows a side view of the plunge pool 20 in FIG. 6, it can be seen that the area behind the steps 220 is hollow or unfilled and forms a cavity 240, similar to rectangular plunge pool 10. As described above, this cavity 240 reduces the volume of concrete necessary to form the plunge pool 20 while consequently reducing the overall weight of the plunge pool thereby making it easier to transport.

In addition, the cavity 240 can be used to conceal and house pumps and filtration systems necessary to keep the water in the plunge pool 20 from stagnating or becoming dirty.

Advantageously, integrally casting the walls and the floor creates a monolithic pool shell that eliminates, or at least substantially reduces, the potential for cracking where the floor and the walls intersect.

Further advantageously, the total installation time can be reduced to approximately 3 weeks, or in some cases even less.

In another particular advantage, the concrete plunge pool can be prefabricated offsite and transported and installed at the desired location. Due to the increased structural integrity provided by the combination of concrete and steel reinforcing, the chance of cracking of the pool during transport and installation is reduced.

The pool shell may be made of any suitable cementitious material, but Earth Friendly Concrete has been identified as being particularly advantageous in that it is both environmentally friendly (80-90% reduction in $CO_2$ emissions compared to Portland cement) and has well suited property such as, for example, a 30% increase in flexural strength, high sulphate resistance, high chloride ingress resistance, high acid resistance, low shrinkage, low heat of reaction, and increased fire resistance.

Throughout this description, the plunge pool 10 illustrated in the figures is predominantly shown as having 4 sidewalls 110 and a floor 10. However, the figures are intended to be only exemplary in nature and the person skilled in the art will realise that the invention as described herein can be applied to plunge pools having other shapes, such as for example, circular, elliptical, kidney, octagonal, or any type of regular or irregular polygonal shape.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A method of forming a plunge pool the method comprising the steps of:
    casting an integral plunge pool shell having a floor, sidewalls, peripheral wall and at least one step or seat feature in a mould from a cementitious material, the floor, sidewalls, peripheral wall and the one seat or step feature having one or more reinforcing elements located therein such that a cavity is formed adjacent the peripheral wall and the at least one step or seat feature;
    extracting the plunge pool shell from the mould; and
    finishing an internal surface of the plunge pool to be waterproof.

2. The method of claim 1, wherein the step of finishing the internal surface of the plunge pool comprises treating the surface with a thermo polymer.

3. A method of installing a plunge pool comprising the steps of:
    forming a plunge pool as claimed in claim 1;
    transporting the plunge pool to a desired location; and
    installing the plunge pool shell at the desired location.

4. The method of claim 3, wherein the step of installing the plunge pool shell at the desired location comprises lifting the plunge pool using ferrules located in a floor of the plunge pool shell.

5. The method of claim 3, wherein the step of installing the plunge pool shell at the desired location comprises lifting the plunge pool using attachment points.

6. The method of claim 1, wherein the one or more reinforcing elements are in the form of reinforcing rods.

7. The method of claim 6, wherein one or more of the reinforcing rods are welded together before locating them in the mould.

8. The method of claim 6, wherein attachment points are mounted to the reinforcing rods.

9. The method of claim 8, wherein the attachment points are in the form of ferrules.

10. The method of claim 6, wherein the reinforcing rods are pre-tensioned prior to the cementitious material being poured into the mould.

* * * * *